Patented Sept. 29, 1931

1,825,463

UNITED STATES PATENT OFFICE

LEWIS B. LINDEMUTH, OF NEW YORK, N. Y.

METHOD OF RECLAIMING STAINLESS STEEL SCRAP

No Drawing.  Application filed July 30, 1930. Serial No. 471,893.

The invention relates to a method of producing high grade stainless steel from scrap of the alloy and also from the scrap of the lower grade stainless steel and has for its object to simplify and expedite the operations necessary to this end.

So-called stainless steels or alloys of iron and chromium, in some instances containing nickel, are of two recognized grades, one containing carbon below .07% and the other having a carbon content from .07% to .16% carbon. The high grade stainless steel usually contains from 8% to 9% of nickel and 16.5% to 19% of chromium. The steel containing the lower percentage of carbon is desirable for most purposes and is more difficult to make.

In the manufacture of articles from so-called stainless steels, there is a considerable element of scrap and heretofore attempts to utilize this scrap, especially in producing the high grade stainless steels low in carbon, have generally failed because the remelting of the scrap causes an increase in the percentage of carbon, which cannot be reduced by ordinary methods without impairing the character and quality of the final alloy or stainless steel. It has been possible to remelt the scrap in an electric furnace of the arc or of the induction type, with an increase in carbon, which permits it to be used for the higher carbon grades of stainless steel, but which are less desirable in the trade. Upon remelting of the scrap resulting from the high carbon grade of stainless steel, the increase in the carbon content is so great as to render the steel practically valueless. The aforesaid conditions materially increase the cost of stainless steels in both these grades, because of the scrap wastage, which could not be recovered or restored to commercial form, but the present invention is designed to utilize the scrap of either grade of stainless steel or of steel which has been fabricated with too high a carbon content for practical use and the method may be successfully and economically applied to the conversion of these various types of steel into stainless steel of the higher grade, to wit, that containing the lower percentage of carbon not in excess of .07%.

In carrying out the process, the scrap is melted in an electric furnace and the molten metal tapped into a ladle and from 1% to 2% of an exothermic reducing agent added to the melt, which reducing agent may be silicon, but is preferably comminuted aluminum. The molten mass is then transferred to a bottom blown Bessemer converter, preferably with a neutral lining, which may be chrome ore, although, if desired, a converter with a basic lining, such as magnesite, may be used. The converter, with its charge, is then blown for a period of time sufficient to reduce the carbon content below .07% and to oxidize approximately 8% of a chromium, which latter goes into the slag. As a practical example, the blowing of three tons of the molten metal, as described, would require 4½ minutes to effect the necessary reduction of the carbon and the oxidation of the chromium to the percentages indicated. After the blow has been completed and the converter is turned down, silicon in an amount sufficient to reduce and recover approximately 2% of the chromium in the slag is added to the blow. This will leave an additional amount of 6% of chromium to be incorporated with the molten metal to produce the stainless steel. It has been found possible with the temperatures developed in the converter and immediately after the blow has been completed, to add 3% of chromium in the form of carbon free ferro-chromium, which will be readily taken up by the melt. This leaves 3% of chromium to be added to produce the desired high grade stainless steel and this is supplied to the molten bath in the form of carbon free ferro-chromium reduced in a separate vessel by alumino-thermic reaction or by the similar reduction of pure metallic chromium, a sufficient quantity of the alumino-thermic metal being added to the previously prepared melt to supply the additional 3% of chromium.

What I claim is:

1. The method of reclaiming stainless steel scrap, which comprises melting the scrap in an electric furnace, tapping the melt into a ladle, adding thereto from 1% to 2% of an exothermic reducing agent, transferring the molten mass to a Bessemer converter, blowing the same until the carbon content is reduced below .07% and approximately 8% of the chromium is oxidized, adding to the molten blown product ferro-chromium to supply approximately 3% of chromium, melting ferro-chromium by the alumino-thermic reaction in a separate crucible, and adding an amount of the melt to the aforesaid blown product to bring the chromium content to the desired total percentage of the alloy.

2. The method of reclaiming stainless steel scrap, which comprises melting the scrap in an electric furnace, tapping the melt into a ladle, adding thereto approximately 1% of aluminum, transferring the molten mass to a Bessemer converter, blowing the same until the carbon content is reduced below .07% and approximately 8% of the chromium is oxidized, adding to the molten blown product ferro-chromium to supply approximately 3% of chromium, melting ferro-chromium by the alumino-thermic reaction in a separate crucible, and adding an amount of the melt to the aforesaid blown product to bring the chromium content to the desired total percentage of the alloy.

3. The method of reclaiming stainless steel scrap, which comprises melting the scrap in an electric furnace, tapping the melt into a ladle, adding thereto from 1% to 2% of an exothermic reducing agent, transferring the molten mass to a Bessemer converter, blowing the same until the carbon content is reduced below .07% and approximately 8% of the chromium is oxidized, adding to the molten blown product silicon to effect reduction of approximately 2% of the chromium in the slag and further adding thereto ferro-chromium to supply approximately 3% of chromium, melting ferro-chromium by the alumino-thermic reaction in a separate crucible, and adding an amount of the melt to the aforesaid blown product to bring the chromium content to the desired total percentage of the alloy.

In testimony whereof I affix my signature.

LEWIS B. LINDEMUTH.